March 10, 1931. H. PARKER 1,795,884
METHOD OF LAYING GROUPS OF MULTIPLE CONDUIT
Filed April 6, 1928
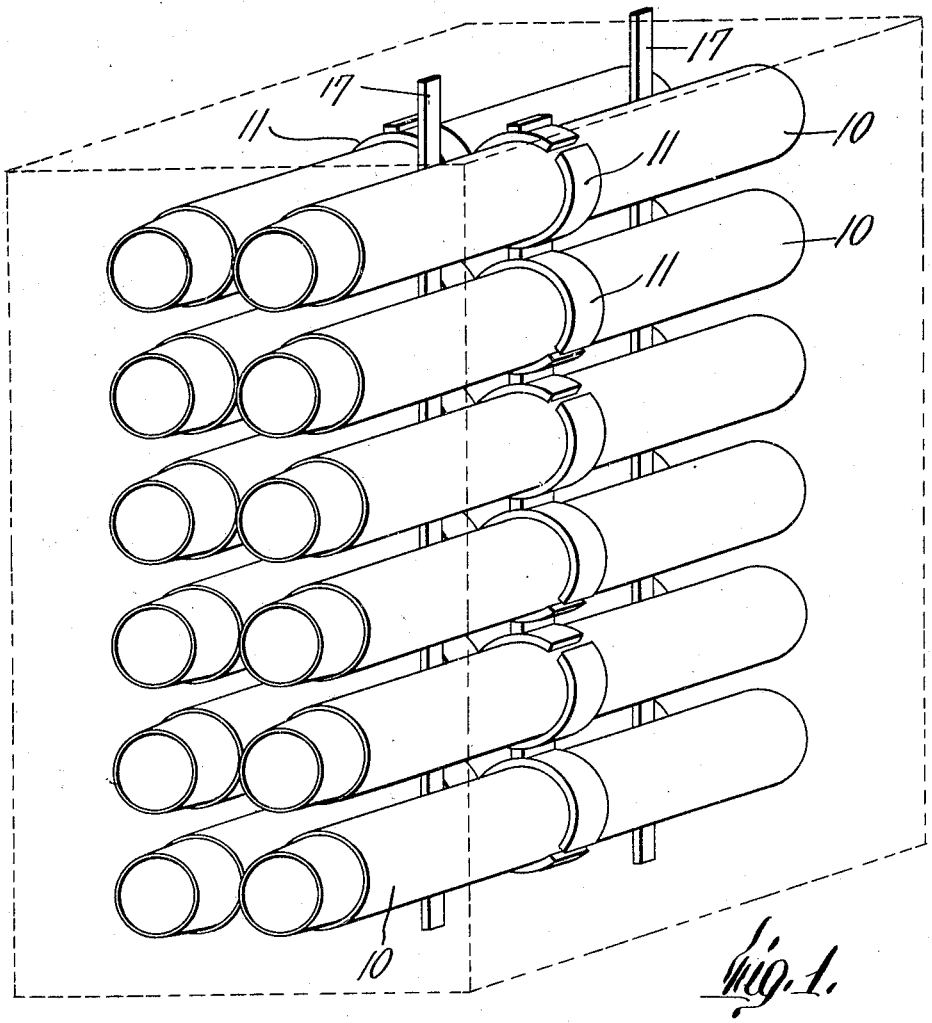
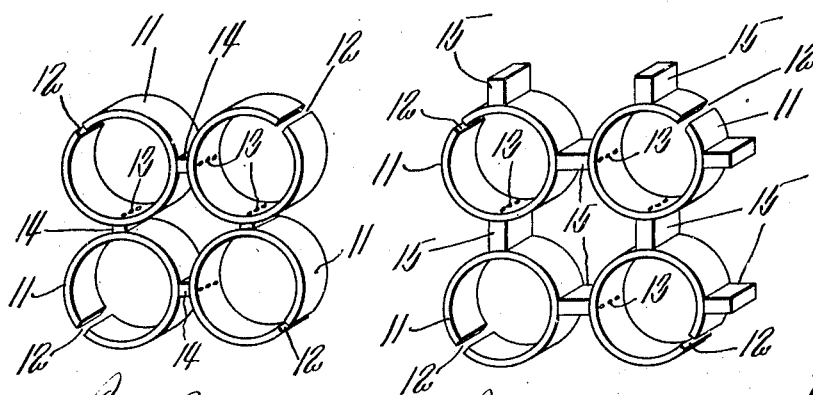
Inventor:
Howard Parker.

Patented Mar. 10, 1931

1,795,884

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

METHOD OF LAYING GROUPS OF MULTIPLE CONDUIT

Original application filed August 31, 1926, Serial No. 132,675. Divided and this application filed April 6, 1928. Serial No. 268,065.

This application is a division of my co-pending application Serial No. 132,675, filed August 31, 1926. The invention relates to a method of alining and laying groups of multiple conduit, particularly conduit of the kind described in my co-pending application referred to.

The use of fiber conduit, impregnated with asphalt, pitch or equivalent waterproofing compound, for carrying electric wires for various purposes, or fluids of various kinds, has become established. Conduit of this type offers advantages of light weight, cheapness and strength. It is easily machined so that water-tight joints are readily made. Where it is desired to run several conduits of this type in a group, the laying of the conduit piece by piece, building up the group from single sections of conduit, and securing the lines of conduit together with spacers and bonds, involve the handling of a great many separate pieces and results in unnecessarily high laying costs. By my invention, I provide means for uniting lengths of fiber conduit into groups to facilitate the laying of multiple conduit by reducing materially the number of separate articles (including sections of conduit, spacers and bonds) which have to be handled. I am aware that tile or vitrified clay conduit is made having multiple passages therein, but such conduit is expensive, heavy, frangible and unsuitable for certain purposes such as carrying fluids or electric power lines. Such conduit is unsuitable for carrying fluids because of the practical impossibility of making the joints between consecutive sections tight so as to keep the various passages in the conduit from leaking into one another. It has been found unsuitable for electric power transmission lines since abnormal conditions which may occur in one of the lines so as to cause excessive heating are liable to fuse the walls of the conduit and thus short-circuit all the lines in the group. These difficulties may be overcome by using fiber conduit as a kind of core mold, filling in around it with concrete. Such a combination is economical since the heavy concrete materials may be obtained locally, thus minimizing transportation and handling costs. Furthermore, the various conduits when laid are separated by concrete which will not break down under high heat but localizes trouble in electric power lines to the line where the trouble begins, and prevents the failure of the rest of the lines. The joints between successive lengths of such conduit are also readily made watertight. In laying multiple conduit, it is sometimes desired to lay a considerable number of parallel lines. In such cases, it may be found desirable to superpose two or more multiple conduit sections to obtain the desired total number of parallel conduits. By my invention, such superposed multiple sections can be readily alined and kept in alinement in the course of assembling the entire conduit structure.

For a more complete understanding of the invention, reference is had to the following description and to the drawing, of which,—

Figure 1 represents in perspective a number of superposed multiple sections illustrating the invention.

Figure 2 illustrates in perspective a spacer for single conduit sections by which multiple sections may be made.

Figure 3 illustrates a spacer unit similar to that shown in Figure 2 but with additional spacer blocks attached thereto.

Referring to the drawings in detail, 10 represents a section of conduit which may be of any desired material, but which for the purposes of this invention is preferably of fibrous material such as wood, or wood pulp, or laminated paper tubing. In particular, a preferred form is fiber tubing having a relatively hard homogeneous wall structure produced by rolling up a sheet of wet pulp under such conditions as to cause the layers to interfelt. Such conduit is capable of being waterproofed by being impregnated with pitch, asphalt or other equivalent waterproofing material, the finished conduit being relatively light, strong and inexpensive.

A number of such conduits may be assembled into a multiple unit as by tie members such as are, for example, illustrated in Figures 2 and 3. The tie members illustrated comprise essentially a plurality of collars 11, there being one such collar in a tie member for each conduit in the multiple unit. The collars 11 are preferably split as at 12 and are of stiff material which, however, should have a certain amount of resilience so that the relative sizes of the conduit and the collar may be such as to cause a resilient gripping engagement of the conduit by the collar.

In the tie members used for holding in assembled position wood fiber conduit, such as is described above, I prefer to use as material therefor cellulose fiber which may be of the same kind as that used for the conduit. For this purpose, I may use short lengths cut from a conduit of the next larger size, the larger conduit having an internal diameter preferably equal to or slightly less than the external diameter of the conduit to be assembled; thus an economy in manufacturing operations may be effected by utilizing the good portions of defective conduit in tie members for a conduit the next size smaller.

The collars 11 may be fastened together by any suitable means, such as, for example, nails, screws, rivets, clips strands or the like. An adhesive may also be used. In making tie members of fiber collars I prefer to use wooden pegs 13 which may be driven through the contiguous portions of the walls of adjacent collars. In order to separate the individual conduit sections in a multiple section sufficiently to facilitate the pouring of concrete therebetween to make a complete encasing structure, the collars 11 are preferably separated by spacer blocks 14 which may be of any desired size or material suitable for the purpose. In Figure 2, for example, spacers 14 of relatively thin material are inserted between each pair of adjacent collars 11 and are secured in place as by pegs 13, or any other suitable fastening devices. In some cases the kind of material chosen for spacers may be governed by a particular use to which the conduit is to be put. For example, for electric power cables, the spacers should be of material with high heat resistant qualities, such as cement or concrete members which may be molded in position between collars 11.

Figure 3 illustrates four collars assembled with wider spacing members 15, additional spacers being shown as attached on the top of the upper collars and on one side of the tie member. These top and side spacers serve to facilitate the uniform spacing of conduit where a number of multiple units are used together in superposed or side-by-side relation.

Figure 1 illustrates a method of arranging or alining a number of suitable units, a surrounding structure of concrete being indicated by dotted lines. Where it is desired to run a considerable number of conduits in a single group, this group may be built up of a plurality of multiple units of four conduits each, held together by tie members as illustrated in Figure 3, for example, or units of larger numbers of conduits may be assembled. For example, the twelve conduits illustrated in Figure 1 may comprise three units of four, or one unit of eight and another unit of four, or six units of two, or any other convenient combination according to the stock which may happen to be on hand. In alining a plurality of multiple units, either vertically as shown in Figure 1, or horizontally, suitable battens 17 may be thrust down between the conduits in the two rows, these battens being of a thickness to fit snugly between the conduits of adjacent rows. The battens not only facilitate the joining of the ends of the conduits to the complementary ends of the conduits in the next successive length of the system, but also hold the units firmly in place while the concrete is poured between and around the conduits and tamped into place.

Having thus described certain embodiments of this invention, it should be evident to those skilled in the art that various changes and modifications might be made therein without departing from its spirit or scope as defined by the appended claims.

I claim:—

1. A method of laying multiple-conduit units comprising single conduits of stiff slightly resilient material held in fixed parallel relation and in two spaced rows, which comprises forming a set of said units, superposing a plurality thereof one on another, thrusting between the vertical rows of conduits in the units, a batten slightly wider than the space between said rows whereby the batten is gripped between the conduits of the two rows and the units are vertically alined, setting up and alining successively similar sets of units, joining the sets end to end with complementary ends of corresponding conduits interengaging, and embedding the whole in concrete.

2. A method of assembling multiple-conduit units, each of which comprises a plurality of stiff slightly resilient single conduit sections held in fixed parallel relation and in two spaced rows, which comprises superposing a plurality of said units and thrusting between the two spaced vertical rows of conduits formed by the superposed multiple units, a batten slightly wider than the space between said two rows whereby the batten is gripped between the pairs of conduits in the two rows.

In testimony whereof I have affixed my signature.

HOWARD PARKER.